United States Patent [19]

Taylor

[11] Patent Number: 4,812,965
[45] Date of Patent: Mar. 14, 1989

[54] REMOTE POSTAGE METER INSEPCTION SYSTEM

[75] Inventor: Michael P. Taylor, Norwalk, Conn.

[73] Assignee: Pitney Bowes Inc., Stamford, Conn.

[21] Appl. No.: 762,991

[22] Filed: Aug. 6, 1985

[51] Int. Cl.⁴ .............................................. G06F 15/02
[52] U.S. Cl. ..................................... 364/550; 340/571
[58] Field of Search ....................... 364/464, 466, 550; 235/101; 379/44; 340/571

[56] References Cited

U.S. PATENT DOCUMENTS

| | | | |
|---|---|---|---|
| 4,096,923 | 6/1978 | Eckert, Jr. et al. | 364/900 MS |
| 4,122,532 | 10/1978 | Dlugos et al. | 364/900 |
| 4,160,899 | 7/1979 | Montagnino et al. | 235/101 |
| 4,253,158 | 2/1981 | McFiggans | 364/900 MS |
| 4,310,754 | 1/1982 | Check, Jr. | 364/464 |
| 4,376,299 | 3/1983 | Rivest | 364/900 MS |
| 4,424,573 | 1/1984 | Eckert, Jr. et al. | 364/900 MS |
| 4,447,890 | 5/1984 | Duwel et al. | 364/900 MS |
| 4,525,785 | 6/1985 | Soderberg et al. | 364/464 |
| 4,549,281 | 10/1985 | Eckert et al. | 364/900 MS |
| 4,559,444 | 12/1985 | Erwin et al. | 235/101 |
| 4,565,995 | 1/1986 | Stokes et al. | 340/571 |
| 4,641,346 | 2/1987 | Clark et al. | 380/3 |
| 4,649,266 | 3/1987 | Eckert | 364/464 X |

Primary Examiner—Parshotam S. Lall
Assistant Examiner—Edward R. Cosimano
Attorney, Agent, or Firm—Peter Vrahotes; Melvin J. Scolnick; David E. Pitchenik

[57] ABSTRACT

A remote inspection of postage meters that reduces the requirement for an on site inspection. The postage meters are programmed to sense and communicate any tampering attempt. The inspection is achieved either through electronic communication or by the mailing of imprinted post cards.

13 Claims, 2 Drawing Sheets

REMOTE POSTAGE METER INSEPCTION SYSTEM

BACKGROUND OF THE INVENTION

Postage meters are in common usage throughout the business world because of their ability to save time and allow an accounting of the amount of postage used. Postage meters are charged with monetary value upon payment to the Post Office of a selected amount. This monetary value is reduced as postage is applied to mail pieces. Because the postage meter does contain monetary value, care must be taken that no unauthorized postage impressions be made for to do so would be defrauding the Postal Service. Various security measures have been devised to prevent postage meter tampering through which unauthorized postage could be printed. Included in such security measures are break away screws, sealed housings, and the fact that postage meters are leased by the user rather than being owned. To ensure that postage meter tampering has not taken place, the U.S. Postal Service has a regulation that every leased postage meter must be physically inspected at least two times a year by the manufacturer of that postage meter. This requires an inspector visiting the premises of the user to carry out the inspection. Similar procedures exist in other countries. The cost of such inspection is approximately $50.00 per inspection or $100.00 a year for every installed postage meter. With almost one million postage meters installed in the United States, this amounts to a cost of approximately one hundred million dollars every year for postage meter inspection.

Recently there have been two developments in the postage meter field that are bringing about substantial changes. One of the developments is a result of the advancement of electronics which has led to the electronic postage meter. The electronic postage meter is one in which solid state devices instead of mechanical systems are used for such purposes as memory and control. The second development is the use of encryption for the purpose of authenticating a postage indicia. It obviously would be beneficial if these recent developments may be utilized to reduce the need for the physical inspection of every postage meter.

SUMMARY OF THE INVENTION

A remote postage meter inspection system has been devised whereby a postage meter may be programmed to indicate the occurrence of any tampering or attempt to obtain unauthorized postage. A postage meter is supplied with sensors that would be electronically polled periodically through a communication link. When an act of tampering has been indicated, then the meter would be either inspected physically or removed. An alternative embodiment to this would be to have a postcard imprinted with the postage indicia by each meter with "tells" to indicate the occurrence of tampering.

DETAILED DESCRIPTION OF THE PREFERRED EMBODIMENTS

Figure 1:
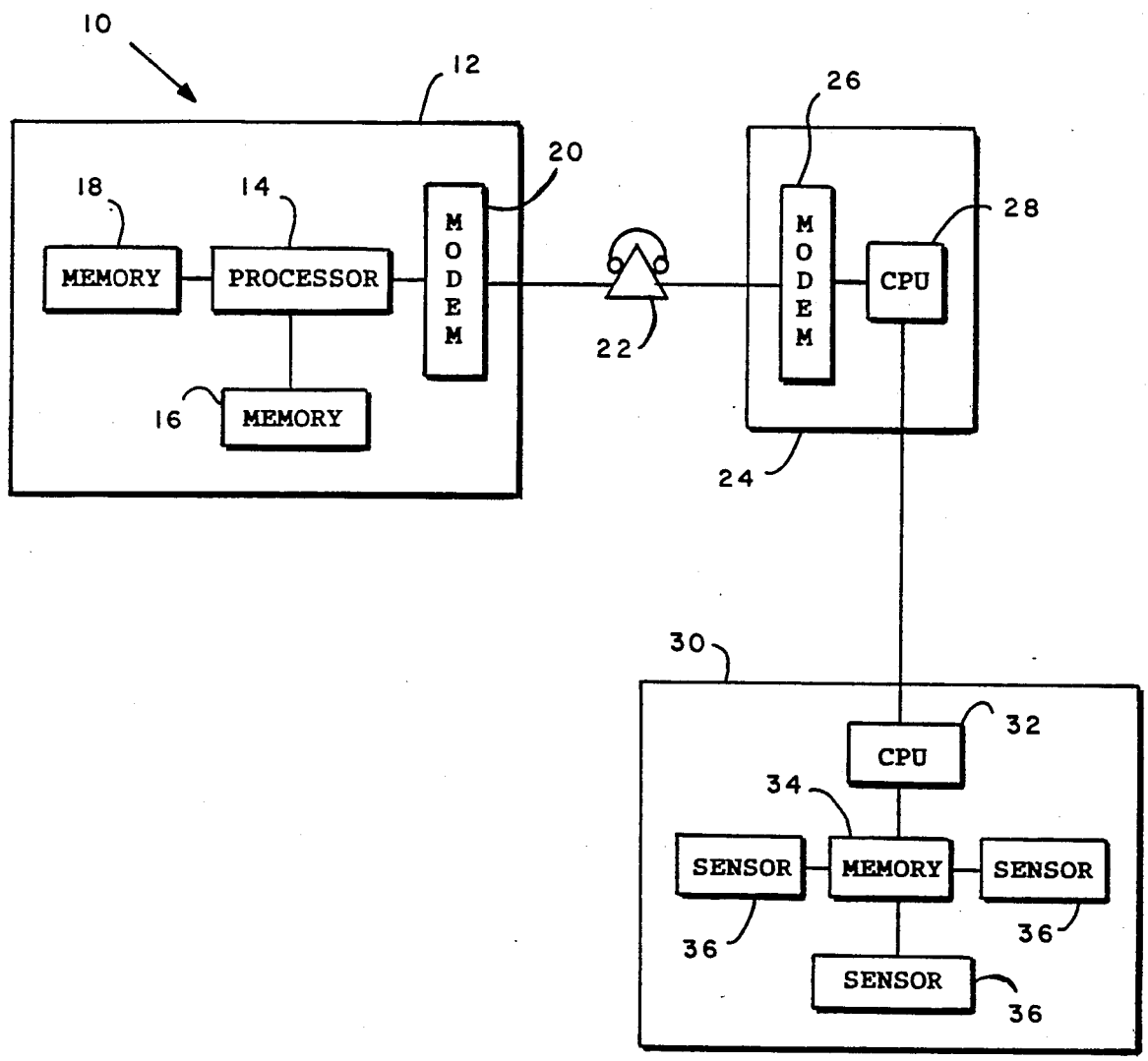
FIG. 1 is a block diagram showing a remote postage meter inspection system.

A postage meter inspection system has been devised that reduces the need for on site inspection. Referring to FIG. 1, a preferred embodiment will be described that allows the inspection of a postage meter remotely. Such a remote postage meter inspection system is shown generally at 10 and includes a central station 12. This central station 12 may be either a Post Office or the office of a postage meter manufacturer. Included within the central station 12 is a processor 14 that is in communication with a memory 16. This memory 16 would include all the postage meters that are to be serviced by the central processing station 12 and would contain information such as a meter number or customer number, the date of last inspection, the name of the user and any other pertinent information such as any history of prior tampering. By tampering is meant any activity that appears to involve the obtaining of fraudulent postage, i.e. the applying of postage to a mail piece without paying or accounting for the same. Also connected to the processor 14 would be a second memory 18 wherein a record of meters that are to be inspected for any given period would be stored. Obviously, these two memories 16,18 could be combined into one if so desired. The central processor 14 is in communication with a communication link or port such as a modem 20 which in turn is in communication with a communication device such as a telephone 22. A postage meter user location 24 would include a communication port, such as a modem 26, that would provide connection between the telephone 22 and a CPU 28. When a postage meter at the user location 24 is to be inspected, communication would be made with the user location 24 by telephone 22 through the modem 26. Alternatively, an inspection may be made simultaneously when remotely recharging a postage meter by having tampering information sent automatically to the central station 12.

The CPU 28 is electrically connected to an electronic postage meter 30 which has a CPU 32 and a memory 34 communicating directly with the CPU 28 the postage meter. Although this embodiment shows only one postage meter 30 in communication with the CPU 28, it will be appreciated that a plurality of postage meters may be connected to the CPU 28 in network fashion. The postage meter 30 has a number of sensors 36 that are in contact with the memory 34. Any attempt of tampering would be sensed by the sensors 36, which, in turn, would communicate such sensing to the memory 34 where a flag would be set. Upon command, the memory 34 would be accessed and a determination made whether a flag had been set which would be an indication of tampering. Such accessing could take place in accordance during power-up of the postage meter 30.

With such a system 10, a number of meters 30 would be assigned for inspection during any given period and each group of meters 30 to be inspected would be supplied through the memory 16. The central station 12 would then be in touch with the user station 24 indicating that inspection is to take place. The processor 14 of the central station 12 would then directly contact the CPU 32 of the postage meter 30 without any intervention or interference on the part of the user. The memory 34 of the postage meter 30 would be scanned to determine if any of the sensors 36 sensed any unusual activity. For example, if an attempt had been made to remove the postage meter cover or a break off screw is broken, an appropriate signal would be received by the central station 12. Another check to be made is whether the sum of the ascending and descending registers equals the control sum. If any indication of tampering is received, a message would be sent to the memory 18 and the meter 30 would be disabled upon command of the processor 14. A print out would show all the postage meters 30 that did not pass the electronic inspection and each of these would be physically inspected. Additionally, the fact that a physical inspection was required for a meter would be stored in the memory 18 so that if a large number of inspections were required over a predetermined period, the meter 30 could either be replaced or the user questioned as to the reason for the frequency of such physical inspection requirement.

Figure 2:
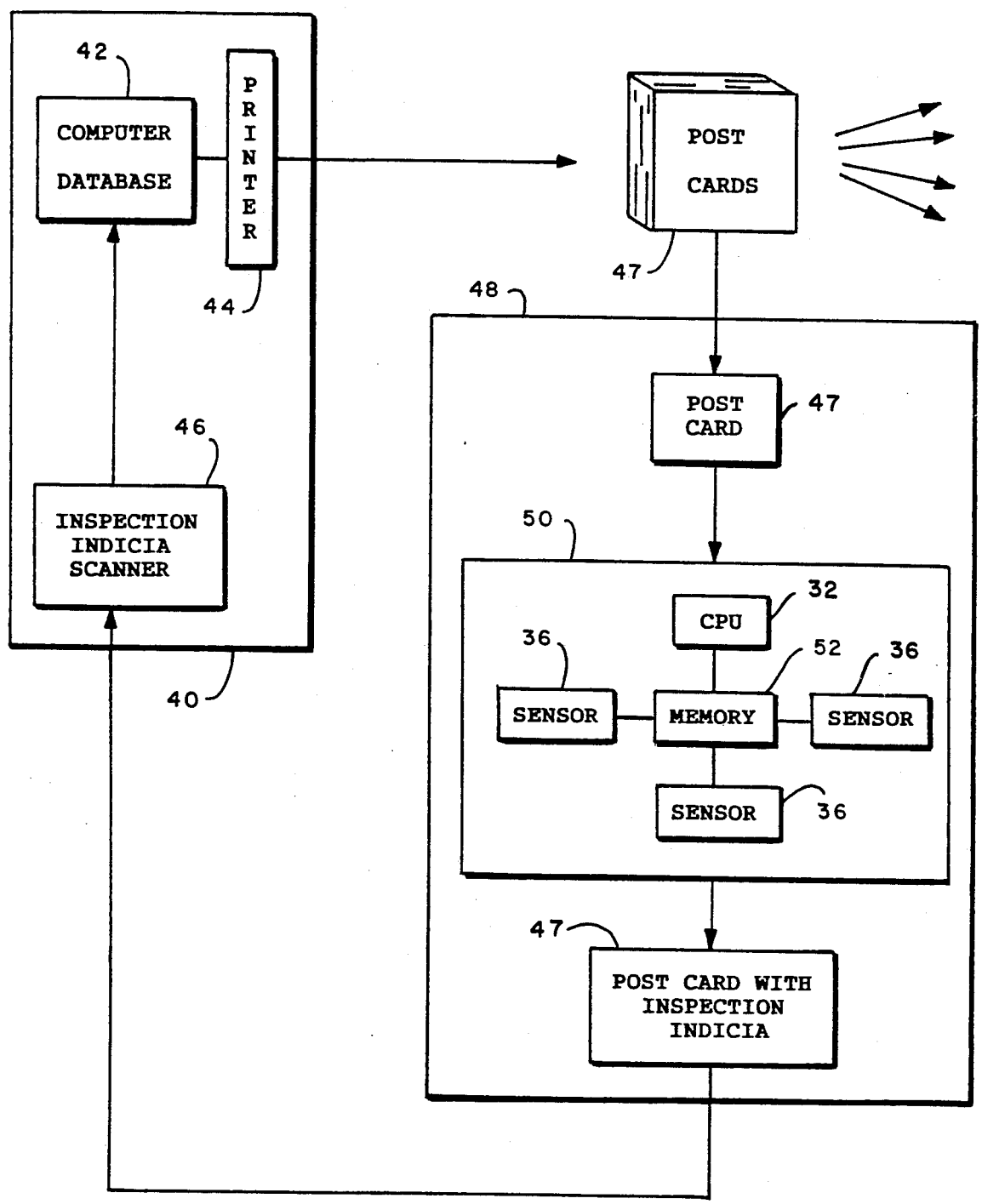
FIG. 2 is a block diagram of an alternative embodiment for a remote postage meter inspection system.

Referring now to FIG. 2, an alternate embodiment of the invention will be described. A central station 40, which again may be either a Post Office or a postage meter manufacturer, includes a computer data base 42 which stores the postage meter information, a printer station 44 and a scanner 46. Periodically, the computer data base 42 will cause the printer station 44 to send a mail piece such as a post card 47 to one of a number of customer or user locations 48. The post card 47 would be received by the postage meter user and a postage indicia would be printed by the user's postage meter 50. The user's postage meter 50 would be programmed so that any tampering would be sensed by sensors 36 and these sensors would send an appropriate signal to the memory 52. In response to these signals, the memory 52 would cause alterations in the postage indicia, each alteration being indicative of a particular sensor. Postage meters having printers capable of variable printing and capable of producing an altered indicia are shown and described in commonly owned U.S. Pat. Nos. 4,641,346 and 4,649,266. The alterations in the pattern of printing by the postage meter 50 are referred to as "tells". A "tell" may be a modified indicia, number, letter, bar code and the like. The postage meter 50 would print a postage indicia with "tells" if any sensor 36 indicated that tampering had taken place or if the sum of the ascending and descending registers did not equal the control sum. The post card 47 printed with the appropriate postage indicia would then be returned to the central station 40 and scanned by the scanner 46. If the scanner 46 finds that there has been any tampering, this would be communicated to the computer data base 42 and the central station operator would cause a physical inspection to take place. If no inspection is required, this would also be communicated to the memory of the data base 42.

What is claimed is:

1. A system for inspecting postage meters remotely, comprising:

a central station, at least one postage meter having a memory therein, means for placing said postage meter in direct communication with said central station, means for sensing postage meter tampering, means for storing in said memory acts of tampering whereby when said central station communicates with said meter said memory will send to said central station an indication of any tampering with said postage meter.

2. A system of claim 1 wherein said means for communicating is a mail piece.

3. A system for inspecting postage meters remotely, comprising:

a central station, at least one postage meter, said postage meter having a memory and a plurality of sensors in communication with said memory, each of said sensors associated with a component of said meter, said sensors generating a signal upon tampering with its respective component, means for placing said postage meter in communication with said central station, means for storing in said memory signals generated by said sensors, whereby when said central station directly communicates with said meter said memory will send to said central station a signal indicative of any tampering with said postage meter.

4. A system for inspecting postage meters remotely, comprising:

a postage meter having a memory therein, means for sensing postage meter tampering, means for storing in said memory acts of tampering and means for directly accessing said memory, whereby said memory will provide an indication of any tampering with said postage meter.

5. A postage meter adapted for remote inspection, comprising:

a postage meter having a memory, variable printing means and a plurality of sensors in communication with said memory, means for connecting each of said sensors with a component of said postage meter, whereby each of said sensors generates a signal upon tampering with its respective component, means for storing in said memory signals generated by said sensors, and means for causing the variable printing means to print an indicia with tells upon storage of said signals in said memory such that each of said tells is indicative of a sensor having detected tampering with said postage meter.

6. In a postage meter having a memory, the combination comprising:

means for sensing tampering with the meter;
means for setting a flag in the postage meter memory in response to said sensing means sensing meter tampering; and
access means associated with the postage meter for directly accessing said memory.

7. The postage meter of claim 6 including means for causing the postage meter to print tells in an indicia in response to the set state of the flag.

8. In a method of remotely inspecting a postage meter having a memory, the steps comprising:

sensing tampering with the postage meter;
setting a flag in the memory in response to the sensing of meter tampering; and
directly accessing the memory to determine if a tampering flag has been set.

9. In a method of remotely inspecting a postage meter having a memory, the steps comprising:

sensing tampering with the postage meter;
setting a flag in the postage meter memory in response to the sensing of meter tampering; and
printing with the postage meter an indicia having tells after said flag has been set in the memory.

10. The method of claim 9 including the steps of sending a mail piece from a central station to the user location of the postage meter, printing an indicia on the mail piece with the postage meter and returning the mail piece to the central station.

11. A system for inspecting postage meters remotely, comprising:

a central station, at least one postage meter, means for placing said postage meter in direct communication with said central station, means for sensing postage meter tampering whereby when said central station communicates with said meter said central station is provided with an indication of the sensing of any tampering with said postage meter.

12. A system of claim 11 wherein said means for communicating is a mail piece.

13. A system for inspecting postage meters remotely, comprising:

a central station, at least one postage meter, said postage meter having a memory and at least one sensor in communication with said memory, means for connecting said at least one sensor with a component of said meter, whereby said at least one sensor provides a signal to said memory upon sensing tampering with said component, means for placing said postage meter in communication with said central station, means for storing in said memory said signal provided by said at least one sensor, whereby when said central station communicates with said postage meter said memory provides to said central station an indication of any tampering with said component of said postage meter.

* * * * *